Patented Sept. 16, 1941

2,256,333

UNITED STATES PATENT OFFICE 2,256,333

PROCESS OF OBTAINING A MIXTURE OF CARBON MONOXIDE AND HYDROGEN IN CONTROLLED PROPORTIONS

William D. Wilcox, Kansas City, Mo.; Mary Palmer Wilcox, executrix of said William D. Wilcox, deceased, assignor to Le Roy J. Snyder, Kansas City, Mo., James V. Richards, Pekin, Ill., and Henry Mills Wilcox, Santa Monica, Calif., as trustees No Drawing. Application January 6, 1938, Serial No. 183,646

7 Claims. (Cl. 252—373)

There has been for some years known and in use, a process of obtaining methanol by the synthesis of a mixture of carbon monoxide and hydrogen. When these gases are subjected to a high pressure at a temperature within the range 200 to 450° C., and in contact with a suitable catalyst such, for example, as zinc oxide, they unite to form methanol according to the equation CO plus $2H_2$ equals $CH_3OH$.

More recently, there have developed procedures in which, by use of a different catalyst, mixtures of carbon monoxide and hydrogen or containing substantial volumes of these gases, are made to unite yielding liquid hydrocarbons suitable for use as motor spirit, according to the equation 9CO plus $18H_2$ equals $C_9H_{18}$ plus $9H_2O$. While other reactions may take place, the predominant reaction is a union of the carbon atoms in the carbon monoxide with double the number of hydrogen atoms and of the oxygen of the carbon monoxide with double the number of hydrogen atoms yielding water.

The gas which can be most advantageously processed either in the synthesis of methanol or the production of motor spirit will be composed of carbon monoxide and hydrogen in the volumetric ratio of one and two, and free from the admixture of other gases such as undecomposed hydrocarbon gas, nitrogen, etc. which do not enter into the reaction.

It is the purpose of the procedure disclosed in this specification, to produce a gas suitable for use in these syntheses, in the most efficient way from the materials which are most readily available and most cheaply obtained. These source materials are in this country, at least natural gas and the relatively lean cracking still gases produced in the refining of petroleum and which are not adapted to the production of motor spirit by polymerization. These gases must be dissociated in admixture with steam by subjection to a high temperature and under conditions which yield a gas in which the proportions of carbon monoxide and hydrogen are in the ratio desired. I have already been granted U. S. Patents Nos. 1,903,845 and 1,905,326, in which hydrocarbon gases are dissociated by heat in admixture with steam, and the ratio of CO to hydrogen controlled either by employing a controlled proportion of carbon dioxide in place of steam in effecting a dissociation of methane, according to the equation $CH_4$ plus $CO_2$ plus heat equals 2CO plus $2H_2$ or by the addition of oxygen to burn out the excess of hydrogen which results when methane is dissociated with steam according to the equation $CH_4$ plus $H_2O$ plus heat equals CO plus $3H_2$.

I have also pending, an application for Patent Serial Number 153,722, filed July 15, 1939, which has matured into Patent No. 2,199,475, May 7, 1940, in which both are added, the addition of the $CO_2$ reducing the volume of oxygen which it is necessary to employ, while the rise in temperature of the already hot and partially dissociated gas which follows when oxygen is added and a partial combustion of hydrogen takes place, assists in securing that complete dissociation of the hydrocarbon gases which it is most difficult to carry to completion by means of the heat imparted from an external source.

The complete freedom from any material percentage of undecomposed hydrocarbon gas obtainable by this addition of oxygen fully justifies, by the increased efficiency in the synthesis of methane, which is obtained through the freedom from inerts, the very considerable cost of obtaining oxygen by the fractioning of air. But in the synthesis of motor spirit which is carried out at substantially atmospheric pressure, the loss incident to the accumulation of nonreactant gases compelling a discharge, unsynthesized, of a portion of the carbon monoxide-hydrogen gas does not involve an equal loss in operating expense incurred. While the purer the gas, the better will be the efficiency of synthesis, a somewhat less expensive process of dissociation in which only a very small residue of undecomposed methane remains may be more economical as measured by net cost of the final product, through eliminating the cost of supplying oxygen.

The most complete elimination without such addition and the resulting addition to the temperature attained, may be obtained in a plant following the general design of that shown in my U. S. 1,916,545. This consists of a refractory walled chamber or series of connected chambers, filled with checker brick or a multiplicity of refractory walled flues. The interior is brought to a high temperature by a precedent combustion of fuel gas. The combustion gas, when discharged, is passed through a heat exchanger, preferably of the recuperator type, and a large part of its remaining sensible heat imparted to the air which supports the combustion of the fuel gas. By this use of preheated air, it becomes possible to bring the refractory filling in the dissociation chamber to temperatures in excess of 2500° F. and preferably within the range of 2800° to 3000° F., in the zone of active combustion. The hot gases will pass for a considerable distance of travel through the chamber or series of chambers, giving up their heat and will preferably be withdrawn at a temperature of no more than 1000 to 1400° F. The enclosing walls of the chambers and the refractory filling in the zone of active combustion, will preferably be of carborundum which has not only the advantage of high resistance to injury by heat, but of much greater heat conductivity than ordinary fire brick so that heat passes readily into the refractory filling and passes out again as the outer surface is cooled much more rapidly. The hydrocarbon gases which are to be dissociated, together with steam in a volume considerably in excess of the volume which, if dissociated, would oxidize all of the carbon of the hydrocarbon gases to carbon monoxide, are admitted to the dissociation chamber at the extremity from which the combustion gases were withdrawn. They pass progressively in contact with more highly heated refractories and are brought finally to a temperature ranging from 2500° F. in the beginning to perhaps 2300° F. at the end of the make cycle. A thermostat upon the gas outlet will enable the operator to know when this lower temperature is reached. He will then displace the hydrocarbon gases by steam and reheat the interior of the chamber. Following the reheating, the combustion gases in the chamber will be displaced by purging with steam to avoid the addition of nitrogen to the product gas.

It is common practice to accelerate the dissociation of the hydrocarbon gases by use of a catalyst. This use has, up to the present time, been limited to procedures in which gas in admixture with steam is passed through externally heated pipes. The chief gain has been in enabling the reaction to take place at a satisfactory rate with a lower temperature, such as the pipes will withstand. Catalyst speed up the rate of the reaction, but do not change equilibrium relations. Since the heat absorbing masses with which the combustion gases are lost in contact prior to their discharge, are heated only to around 1200° F., it is in the procedure I have described, possible to coat them with finely divided nickel. Means of access to this portion of the chamber will be provided to facilitate renewal of the catalyst and a considerable betterment in the rate of dissociation will be obtained. These will be no use of catalyst in the high temperature zone.

It has been found possible to effect, using the means described, a dissociation of 95 to 97% of the hydrocarbon gases, with a rate of throughput which is practicable. To attain a higher degree of dissociation would require a prolonged time of subjection to heat. The other conditions remaining constant, the rate of dissociation slows down as the volume of undecomposed hydrocarbon gas becomes less. If 100 c. f. of $CH_4$ be thus treated, the product assuming a 97% dissociation will be 97 c. f. CO plus 291 c. f. $H_2$ plus 3 c. f. $CH_4$ plus X undecomposed steam. The actual percent of methane in the product gas is .0076 only. But it will be noted that the ratio of hydrogen to carbon monoxide is greater than the two to one desired. In my prior patents, this excess would have been removed as $H_2O$ by union with added oxygen and, providing in the partial combustion a very great increase in the final temperature. The excess of hydrogen is less where hydrocarbon gases containing two or more atoms of carbon in the molecule are treated, but even with such gases produced in great volume in the cracking of oil, there will ordinarily be some excess of hydrogen. The ordinarily desired ratio of 1CO to $2H_2$ can now be attained without this use of oxygen, by adding to the gas around 200 c. f. of water gas obtained by the gasification of coke according to the equation C plus $H_2O$ plus heat equals CO plus $H_2$. As there is some slight excess of hydrogen actually produced in this reaction, this addition may be 100CO plus $103H_2$. The proportions of CO to hydrogen may, if desired, be varied in either direction by varying the proportions of dissociated gas and water gas. The water gas added will, in my process, be produced by passing the gas and steam from the dissociation chamber through a gas generator filled with coke which has been blasted with air to incandescence during the reheating cycle in the dissociation chamber where the ratio of carbon monoxide to hydrogen in the final product is materially less than 1:2 or where the hydrocarbon gas subjected to dissociation is much richer in carbon than methane, there will be sufficient heat in the dissociated gas and excess steam to produce the desired addition of water gas without the necessity of blasting the coke with air. The surplus heat in the gas, as anticipated by the excess in its temperature above 1800° F., will support the evolution of all the water gas needed and the hot gases rising upward through the coke will bring it to 1800° F. by the time it descends to the zone where the water gas is formed.

It may be noted that since the product gas will be withdrawn from this generator at around 1800° F., all the heat in the gas and in the undecomposed steam which they contain in excess of their heat content at 1800° F., is available to support the reaction C plus $H_2O$ equals CO plus $H_2$ with an efficiency of approximately 100%. I obtain a double value from the steam. I am able to use the excess of steam added with the gas to accelerate the reaction in the dissociation chamber and to then use it most effectively in the production of the water gas. How the product gas finally attained will compare with that obtained in my earlier processes, in cost and in suitability for use in the synthesis of methanol, I am not definitely assured. It will be well adapted to the production of motor spirit and will yield much better results in synthesis than will many of the gas mixtures which are employed.

The blast gases from the water gas generator are fully consumed by the addition of air, as in the usual practice, and all of the product gas may be passed through a waste heat boiler and will produce, so used, all the steam required in the process. Employing the heating gases from the dissociation chamber to preheat the air and generating steam in a waste heat boiler as proposed, the thermal efficiency realized from the fuel burned, is high. If desired, the blast gas from the generator, instead of being passed through a waste heat boiler as suggested may be added to the fuel gas burned during the blast cycle to heat the refractory filled chamber in which the dissociation of the hydrocarbon gas takes place.

I am aware of a U. S. patent prior granted, in which it is proposed to obtain a mixture of carbon monoxide and hydrogen in the ratio of one and two, by passing hydrocarbon gas and steam in controlled proportions through a body of incandescent coke achieving, in the one procedure, the two reactions: $CH_4$ plus $H_2O$ equals CO plus $3H_2$—C plus $H_2O$ equals CO plus $H_2$, and thus obtaining a mixture of gases suitable for use in the synthesis of methanol.

There are two disadvantages in the use of this procedure. One may be called technical, the other economic. It is exceedingly difficult to heat the coke in a water gas generator to a temperature much in excess of around 1800° F. When the coke has attained this temperature, the $CO_2$ which results from the initial combustion in the lower level, is converted to CO by contact with the coke according to the equation, C plus $CO_2$ equals 2CO, with absorption of heat. A pound of carbon burned to CO yields only 4420 B. t. u. in place of 14,600 B. t. u. generated by its combustion to $CO_2$, and from the 4420 B. t. u., we must deduct the heat carried from the generator by the 7.9 lbs. of blast gas passing out for each pound of carbon burned to CO. If the temperature of the issuing blast gas be 1800° F., most of this 4420 B. t. u. is carried away. This involves an inefficient burning of coke and limits the creation of a dissociating temperature in the coke except in the very thin zone of combustion to $CO_2$ to not much over 1800° F. Passing methane through the coke, the degree of dissociation resulting will, as a fact, fall far short of that obtained under the conditions of operation in the dissociation chamber which I have stipulated. The economic disadvantage is that in the operation of the prior patented procedure, all the heat employed is obtained by a very inefficient combustion of coke. Where natural gas is abundant, the cost of heat units in coke is many times the cost of the same heat units in gas, and this situation exists in a somewhat less degree with respect to the residue gases in an oil refinery.

I am aware that most of what I propose is not new. I use old and well known reactions and steps long used in causing them to take place, but I submit that I have so combined them as to achieve a greatly improved efficiency both in the completeness of the dissociation achieved and in the utilization of the fuel burned, as compared with any procedure employed or proposed, of which I have knowledge.

I claim:

1. The process of obtaining a mixture of carbon monoxide and hydrogen in controlled proportions which comprises heating the interior of a refractory walled dissociation chamber filled with refractory heat absorbing masses to a temperature in excess of 2500° F., by a combustion of fuel gas in the chamber, conveying the combustion gas through a heat exchanger and preheating the air which supports the combustion of the fuel gas, then passing hydrocarbon gases to which have been added a volume of steam in excess of that, which if dissociated, would oxidize the carbon of the hydrocarbon gas to carbon monoxide, through the dissociation chamber, in a direction of travel counter-current to the travel of the heating gas, with a time of contact with the heated refractories within the chamber such as effects a nearly complete dissociation of the hydrocarbon gas; then bringing about an increase in the ratio of carbon monoxide relative to hydrogen in the gas, by passing the gas from the dissociation chamber through a body of coke prior heated, to incandescence, in a connected generator and converting the undecomposed steam in the gas to carbon monoxide and hydrogen by union with the coke.

2. The improvement in the process described in claim 1 which consists in depositing a suitable catalyst upon the refractory filling in the less highly heated portion of the dissociation chamber.

3. The process of obtaining a mixture of carbon monoxide and hydrogen in controlled proportions which comprises the bringing of the interior of a refractory walled dissociation chamber, having a filling of refractory heat absorbing masses, to a temperature in excess of 2500° F., in the zone of active combustion, by the periodic burning of fuel gas in the interior of the chamber, then passing hydrocarbon gases to which has been added a volume of steam much in excess of the volume which, if fully dissociated, would oxidize the carbon of the hydrocarbon gas to carbon monoxide, through the dissociation chamber in a direct counter-current to the travel of the heating gases, through the chamber, so controlling the rate of throughput and the time of contact of the gas and steam with the heated surfaces within the chamber, as to effect a substantially complete dissociation of the hydrocarbon gas, then passing the gas-steam mixture through a generator filled with coke brought to incandescence by a precedent blasting with air and converting the undecomposed steam to water gas, so controlling the volume of steam added as to obtain a volume of water gas such as equalizes the excess of hydrogen in the gas obtained by the dissociation of the hydrocarbon gas and secures a product in which the ratio of carbon monoxide and hydrogen is, as desired.

4. The process of obtaining a mixture of carbon monoxide and hydrogen in controlled proportions which comprises effecting a substantially complete dissociation of hydrocarbon gases in admixture with steam by passing it through a refractory walled dissociation chamber filled with refractory heat absorbing masses brought to a temperature in excess of 2500° F., by a precedent combustion of fuel gas within the chamber, then passing the product gas through a body of coke prior heated to incandescence, together with steam, producing such a volume of water gas by the reaction of the steam with the coke, as will offset any excess of hydrogen in the gas obtained by the dissociation of the hydrocarbon gas above the ratio relative to carbon monoxide, which is desired.

5. The process of obtaining a mixture of carbon monoxide and hydrogen in controlled proportions, which comprises effecting a substantially complete dissociation of hydrocarbon gases by passing them in admixture with a volume of steam substantially in excess of the volume required to oxidize the carbon of the hydrocarbon gas to carbon monoxide, through a chamber filled with refractory heat absorbing masses, prior heated by an internal combustion of fuel gas within the chamber to a temperature in excess of 2500° F.; then passing the dissociated gas and excess of steam remaining unchanged through a body of coke within a generator chamber, the coke being prior heated by blasting with air where it is desired to obtain a volume of water gas in excess of that obtainable from the excess of heat in the gas in order to secure the desired ratio of carbon monoxide to hydrogen.

6. The process of obtaining a mixture of carbon monoxide and hydrogen in controlled proportions, which comprises the substantially complete dissociation of a volume of hydrocarbon gas to which has been added a volume of steam materially in excess of that required to oxidize the carbon of the hydrocarbon gas to carbon monoxide by its passage through a chamber filled with refractory heat absorbing masses brought to a temperature in excess of 2500° F., by the prior combustion of fuel gas within the chamber and thereafter increasing the proportion of carbon monoxide to hydrogen in the final product, by passing the dissociated gas with the undecomposed steam through a body of coke, utilizing in the production of water gas, the excess heat in the gas and steam in excess of that required to create a temperature at which water gas is evolved.

7. In the operation of the process disclosed in claim 6, the improvement which consists in highly preheating the air which supports the combustion of the fuel gas within the dissociating chamber by heat exchange with the discharged combustion gases.

WILLIAM D. WILCOX.